(12) United States Patent
Kato et al.

(10) Patent No.: US 7,735,105 B2
(45) Date of Patent: Jun. 8, 2010

(54) BROADCAST RECEIVING METHOD

(75) Inventors: Yumiko Kato, Osaka (JP); Takahiro Kamai, Kyoto (JP); Kenji Mizutani, Nara (JP); Hideyuki Yoshida, Kyoto (JP)

(73) Assignee: Panasonic Corporation, Osaka (JP)

( * ) Notice: Subject to any disclaimer, the term of this patent is extended or adjusted under 35 U.S.C. 154(b) by 1218 days.

(21) Appl. No.: 10/415,176

(22) PCT Filed: Aug. 22, 2002

(86) PCT No.: PCT/JP02/08455

§ 371 (c)(1),
(2), (4) Date: Nov. 3, 2003

(87) PCT Pub. No.: WO03/021943

PCT Pub. Date: Mar. 13, 2003

(65) Prior Publication Data
US 2004/0073493 A1   Apr. 15, 2004

(30) Foreign Application Priority Data
Aug. 28, 2001   (JP)   .............................. 2001-258564

(51) Int. Cl.
*G06F 3/00*   (2006.01)
(52) U.S. Cl. ........................... 725/60; 705/26; 704/231; 704/246; 704/251; 704/254; 704/270.1
(58) Field of Classification Search .................. 725/60; 705/26; 704/231, 246, 251, 254, 275, 270, 704/270.1
See application file for complete search history.

(56) References Cited

U.S. PATENT DOCUMENTS

| 5,682,486 | A | | 10/1997 | Grossman et al. |
| 5,884,249 | A | * | 3/1999 | Namba et al. ................... 704/9 |
| 6,131,086 | A | * | 10/2000 | Walker et al. .................. 705/26 |
| 6,543,052 | B1 | * | 4/2003 | Ogasawara ................... 725/60 |
| 7,120,924 | B1 | * | 10/2006 | Katcher et al. ................ 725/60 |
| 7,536,706 | B1 | * | 5/2009 | Sezan et al. .................. 725/113 |
| 2001/0034659 | A1 | * | 10/2001 | Kobayashi ................... 705/26 |
| 2002/0022960 | A1 | | 2/2002 | Charlesworth et al. |
| 2002/0143550 | A1 | * | 10/2002 | Nakatsuyama ........... 704/270.1 |

(Continued)

FOREIGN PATENT DOCUMENTS

EP   0 713 335  A2   5/1996

(Continued)

OTHER PUBLICATIONS

Japanese Office Action for 2003-526145, dated Oct. 18, 2005.

(Continued)

*Primary Examiner*—Brian T Pendleton
*Assistant Examiner*—Nnenna N Ekpo
(74) *Attorney, Agent, or Firm*—RatnerPrestia

(57) ABSTRACT

To purchase an item which is viewed on a broadcast. The items may include furniture, jewelry, clothing and automobiles. The viewer is able to utter a phrase in reference to a viewed item that they wish to view or purchase. The system then searches the broadcast information and displays all relevant items. The viewer is then able to select and purchase a particular item.

33 Claims, 6 Drawing Sheets

U.S. PATENT DOCUMENTS

2002/0194604 A1* 12/2002 Sanchez et al. ............... 725/60

FOREIGN PATENT DOCUMENTS

| EP | 0 952 734 A2 | 10/1999 |
| EP | 0 982 947 A2 | 3/2000 |
| JP | 08-272582 | 10/1996 |
| JP | 08-289042 | 11/1996 |
| JP | 10-177532 | 6/1998 |
| JP | 2000-41198 | 2/2000 |
| JP | 2000-069442 A | 3/2000 |
| JP | 2001-258011 | 9/2001 |
| JP | 2001-356794 | 12/2001 |
| JP | 2002-165193 | 6/2002 |
| WO | WO 01/19085 * | 3/2001 |
| WO | WO 01/19085 A1 | 3/2001 |
| WO | WO 01/57758 A1 | 8/2001 |
| WO | WO 01/67766 A1 | 9/2001 |

OTHER PUBLICATIONS

Supplementary European Search Report, corresponding to Application No. EP 02-76-0697, dated Oct. 6, 2005.

Japanese International Search Report for PCT/JP02/08455, dated Dec. 10, 2002.

English translation of Japanese International Search Report for PCT/JP02/08455, dated Dec. 10, 2002.

* cited by examiner

BROADCAST RECEIVING METHOD

This application is a U.S. National Phase Application of PCT International Application PCT/JP02/08455.

TECHNICAL FIELD

The present invention relates to a broadcast receiving method of receiving a broadcast sent from a broadcasting station, a broadcast contents creating method, a broadcast system, a broadcast contents creating apparatus, a transmitter, a medium, and a program.

BACKGROUND ART

When watching a program or a commercial being broadcast in a conventional television broadcasting, a viewer may wish to obtain a thing appearing in the program or the commercial or an object such as a piece of music played in the program or the commercial.

In such cases, first, the viewer connects a PC (personal computer) to the Internet, searches for information on these objects on the Internet, and obtains information on the target objects.

Then, based on the obtained information, the viewer contacts or goes to a shop selling the objects, and purchases the objects. Conventionally, viewers purchase objects appearing in programs and commercials by such a process.

On the other hand, while video and audio are normally broadcast as programs and commercials in television broadcasting, there is a broadcasting form such that not only video and audio are broadcast as programs and commercials but also data broadcasting is performed to broadcast, as data, additional information on objects appearing in the programs and commercials.

When broadcasting is performed in such a broadcasting form, it is necessary to previously associate the additional information being broadcast as data with objects appearing in programs and commercials. And when video and audio of programs and commercials are broadcast, it is necessary that the additional information previously associated with the objects be broadcast as data broadcasting so as to synchronize with the video and audio.

Conventionally, to associate the additional information being broadcast as data broadcasting with objects appearing in a program or a commercial, after creating the video and audio of the program or the commercial, the producer of the program or the commercial associates the additional information with each scene while checking the scenes of the video and audio. As described above, the association of the additional information being broadcast as data broadcasting with objects appearing in a program or a commercial is performed by hand by the producer.

However, for a viewer to obtain an object appearing in a program or a commercial being broadcast, it is necessary to connect to the Internet from a PC completely irrespective of reception of the broadcast, download information on the target object through the Internet and order the object by telephone or the like based on the downloaded information, which is inconvenient.

That is, it has been an object in the conventional broadcasting that obtaining objects appearing in programs and commercials being broadcast cannot be easily performed and requires time and trouble, which is inconvenient.

On the other hand, while video and audio are normally broadcast as programs and commercials in television broadcasting, to perform broadcasting in the broadcasting form such that not only video and audio are broadcast as programs and commercials but also data broadcasting is performed to broadcast, as data, additional information on objects appearing in the programs and commercials, the association of the program additional information requires a great deal of labor of the producers, so that it is difficult to provide sufficient additional information.

That is, it is an object that when not only the video and audio of programs and commercials are broadcast but also additional information on objects appearing in the programs and commercials is broadcast as data broadcasting, since it is necessary to previously perform the association of the program additional information and the association requires a great deal of labor, it is difficult to provide sufficient additional information.

DISCLOSURE OF INVENTION

In view of the above-mentioned problems, an object of the present invention is to provide a broadcast receiving method, a broadcasting system, a first apparatus, a second apparatus, a medium and a program with which objects appearing in programs and commercials being broadcast can be easily obtained without any trouble.

Moreover, in view of the above-mentioned problems, an object of the present invention is to provide a broadcast contents creating apparatus, a transmitter, a medium and a program capable of reducing the labor and cost required for the association of the program additional information with objects appearing in programs and commercials being broadcast, and consequently, providing sufficient additional information.

To solve the above problem, a first aspect of the present invention is a broadcast receiving method wherein a broadcast of broadcasting additional information associated with an object appearing in contents being broadcast from a broadcasting station simultaneously with the contents is received, wherein a voice uttered by a viewer is voice-recognized, wherein the object is identified or narrowed down based on a result of the voice recognition, and wherein the additional information associated with the identified or narrowed down object is displayed.

A second aspect of the present invention is a broadcast receiving method according to the first aspect of the present invention, wherein said additional information also includes information for identifying or narrowing down the object, and wherein to identify or narrow down the object based on the result of the voice recognition is to identify or narrow down the object by use of the information for identifying or narrowing down the object.

A third aspect of the present invention is a broadcast receiving method according to the second aspect of the present invention, wherein said voice recognition also recognizes an expression indicating the past is also recognized, wherein said result of the voice recognition includes the recognized expression indicating the past, and wherein said recognized expression indicating the past and a time width or the number of scenes of the broadcast corresponding to the expression are associated with each other.

A fourth aspect of the present invention is a broadcast receiving method according to the third aspect of the present invention, wherein in identifying or narrowing down the object by use of the information for identifying or narrowing down the object, the information for identifying or narrowing down the object is narrowed down or weighted based on the time width or the number of scenes corresponding to the recognized expression indicating the past, and the object is identified or narrowed down by use of the narrowed down or weighted information.

A fifth aspect of the present invention is a broadcast receiving method according to the first aspect of the present invention, wherein to identify or narrow down the object based on the result of the recognition is to identify a point of time when the viewer utters the voice, display the broadcast recorded for a predetermined period to the identified point of time, and identify or narrow down the object by selecting the object from the displayed broadcast.

A sixth aspect of the present invention is a broadcast receiving method according to any of the first to the fifth inventions, wherein when a predetermined operation on the displayed additional information is performed, an instruction corresponding to the predetermined operation is transmitted to a predetermined destination.

A seventh aspect of the present invention is a broadcast receiving method according to the sixth aspect of the present invention, wherein said additional information is merchandise sales information and/or service sales information, and wherein said instruction corresponding to the predetermined operation is a request for information on the merchandise and/or the service, or purchase information.

Moreover, an eighth aspect of the present invention is a broadcast contents creating method of creating contents of a broadcast by broadcasting additional information associated with an object appearing in the broadcast sent from a broadcasting station, simultaneously with the broadcast, wherein a transmitter of transmitting identification information identifying the additional information is previously attached to objects appearing in the contents to be broadcast, the object with which the additional information is to be associated, and wherein when the identification information is being transmitted while the contents to be broadcast are being shot, the additional information corresponding to the received identification information is recorded so as to be in synchronism with shot audio and video.

Moreover, a ninth aspect of the present invention is a broadcasting system comprising: a first apparatus of broadcasting additional information associated with an object appearing in contents to be broadcast, simultaneously with the contents; and a second apparatus comprising: receiving means of receiving the broadcast; voice recognizing means of recognizing a voice uttered by a viewer; identifying or narrowing down means of identifying or narrowing down the object based on a result of the voice recognition; and display means of displaying the additional information associated with the identified or narrowed down object.

Moreover, a tenth aspect of the present invention is a broadcasting system according to the ninth aspect of the present invention, wherein said second apparatus comprises transmitting means of transmitting, when a predetermined operation on the displayed additional information is performed, an instruction corresponding to the predetermined operation to a predetermined destination.

Moreover, an eleventh aspect of the present invention is a broadcast contents creating apparatus of creating contents of a broadcast of broadcasting additional information associated with an object appearing in contents sent from a broadcasting station, simultaneously with the contents, said broadcast contents creating apparatus comprising:

a transmitter attached to, of objects appearing in the contents to be broadcast, the object with which the additional information is to be associated, said transmitter transmitting identification information identifying the additional information associated with the object;

receiving means of receiving the identification information from the transmitter while the contents to be broadcast are being shot; and recording means of recording the additional information in accordance with the received identification information so as to be in synchronism with shot video and audio while the contents to be broadcast are being shot.

Moreover, a twelfth aspect of the present invention is a transmitter used for a broadcast contents creating apparatus of creating contents of a broadcast of broadcasting additional information associated with an object appearing in a broadcast sent from a broadcasting station, simultaneously with the broadcast, said transmitter comprising transmitting means attached to, of objects appearing in the contents to be broadcast, the object with which the additional information is to be associated, said transmitting means transmitting identification information identifying the additional information associated with the object, said broadcast contents creating apparatus comprising: receiving means of receiving the identification information from the transmitting means while the contents to be broadcast are being shot; and recording means of recording the additional information in accordance with the received identification information so as to be in synchronism with shot video and audio while the contents to be broadcast are being shot.

Moreover, a thirteenth aspect of the present invention is a first apparatus comprising broadcasting means of broadcasting additional information associated with an object appearing in contents to be broadcast, simultaneously with the contents, wherein said broadcast is received by a second apparatus comprising: receiving means of receiving the broadcast; voice recognizing means of recognizing a voice uttered by a viewer; identifying or narrowing down means of identifying or narrowing down the object based on a result of the voice recognition; and display means of displaying the additional information associated with the identified or narrowed down object.

Moreover, a fourteenth aspect of the present invention is a first apparatus according to the thirteenth aspect of the present invention, wherein said second apparatus comprises transmitting means of transmitting, when a predetermined operation on the displayed additional information is performed, an instruction corresponding to the predetermined operation to a predetermined destination.

Moreover, a fifteenth aspect of the present invention is a second apparatus comprising: receiving means of receiving a broadcast being broadcast from a first apparatus of broadcasting additional information associated with an object appearing in contents to be broadcast, simultaneously with the contents;

voice recognizing means of recognizing a voice uttered by a viewer;

identifying or narrowing down means of identifying or narrowing down the object based on a result of the voice recognition; and display means of displaying the additional information associated with the identified or narrowed down object.

Moreover, a sixteenth aspect of the present invention is a second apparatus according to the fifteenth aspect of the present invention, wherein said additional information also includes information for identifying or narrowing down the object, and wherein said voice recognizing means identifies or narrows down the object by use of the information for identifying or narrowing down the object.

Moreover, a seventeenth aspect of the present invention is a second apparatus according to the sixteenth aspect of the present invention, comprising additional information storing means of storing the additional information being broadcast for a predetermined period to a point of time when the viewer utters the voice, wherein said identifying or narrowing down means identifies or narrows down the object for objects corresponding to the stored additional information.

Moreover, an eighteenth aspect of the present invention is a second apparatus according to the sixteenth aspect of the present invention, comprising broadcast contents recording means of recording the contents being broadcast, for a predetermined period, wherein said identifying or narrowing down means also identifies the point of time when the viewer utters the voice, and wherein said display means also displays, when displaying the additional information associated with the identified or narrowed down object, the contents recorded for the predetermined period to the identified point of time.

Moreover, a nineteenth aspect of the present invention is a second apparatus according to the sixteenth aspect of the present invention, wherein said voice recognizing means also voice-recognizes an expression indicating the past, wherein said result of the voice recognition includes the recognized expression indicating the past, and wherein said recognized expression indicating the past is associated with a time width or the number of scenes of the broadcast corresponding to the expression.

Moreover, a twentieth aspect of the present invention is a second apparatus according to the nineteenth aspect of the present invention, comprising learning means of learning the association of the recognized expression indicating the past with the time width or the number of scenes of the broadcast corresponding to the expression, based on a user's instruction.

Moreover, a twenty-first aspect of the present invention is a second apparatus according to the nineteenth or the twentieth aspect of the present invention, wherein said identifying or narrowing down means narrows down or weights, when identifying or narrowing down the object by use of the information for identifying or narrowing down the object, the information for identifying or narrowing down the object based on the time width or the number of scenes corresponding to the recognized expression indicating the past, and identifies or narrows down the object by use of the narrowed down or weighted information.

Moreover, a twenty-second aspect of the present invention is a second apparatus according to the fifteenth aspect of the present invention, wherein said identifying or narrowing down means identifies a point of time when the viewer utters the voice, the display means displays the broadcast recorded for a predetermined period to the identified point of time, and the identifying or narrowing down means identifies or narrows down the object by selecting the object from the displayed broadcast.

Moreover, a twenty-third aspect of the present invention is a second apparatus according to the twenty-second aspect of the present invention, wherein said broadcast recorded for the predetermined period to the identified point of time is one recorded by a broadcasting station, and wherein said display means performs the display by obtaining, from the broadcasting station, the broadcast recorded for the predetermined period to the identified point of time by transmitting the identified point of time to the broadcasting station.

Moreover, a twenty-fourth aspect of the present invention is a second apparatus according to the twenty-second aspect of the present invention, comprising recording means of recording the broadcast recorded for the predetermined period to the identified point of time, wherein said display means performs the display by playing back the broadcast recorded for the predetermined period to the identified point of time.

Moreover, a twenty-fifth aspect of the present invention is a second apparatus according to any of the fifteenth to the twenty-fourth aspects of the present invention, comprising transmitting means of transmitting, when a predetermined operation on the displayed additional information is performed, an instruction associated with the predetermined operation to a predetermined destination.

Moreover, a twenty-sixth aspect of the present invention is a second apparatus according to the twenty-fifth aspect of the present invention, wherein said predetermined destination is a broadcasting station.

Moreover, a twenty-seventh aspect of the present invention is a second apparatus according to the twenty-fifth aspect of the present invention, wherein in said additional information, a predetermined instruction destination is described, and wherein said predetermined destination is the predetermined instruction destination.

Moreover, a twenty-eighth aspect of the present invention is a second apparatus according to any of the twenty-fifth to the twenty-seventh aspects of the present invention, wherein said additional information is merchandise sales information and/or service sales information, and wherein said instruction corresponding to the predetermined operation is a request for information on the merchandise and/or the service, or purchase information.

Moreover, a twenty-ninth aspect of the present invention is a program of causing a computer to function as all or some of the following means of the second apparatus according to the fifteenth aspect of the present invention: receiving means of receiving a broadcast being broadcast from a first apparatus of broadcasting additional information associated with an object appearing in contents to be broadcast, simultaneously with the contents;

voice recognizing means of recognizing a voice uttered by a viewer;

identifying or narrowing down means of identifying or narrowing down the object based on a result of the voice recognition; and display means of displaying the additional information associated with the identified or narrowed down object.

Moreover, a thirtieth aspect of the present invention is a program of causing a computer to function as all or some of the following means of the broadcast contents creating apparatus according to the eleventh aspect of the present invention: a transmitter attached to, of objects appearing in the contents to be broadcast, the object with which the additional information is to be associated, said transmitter transmitting identification information identifying the additional information associated with the object;

receiving means of receiving the identification information from the transmitter while the contents to be broadcast are being shot; and recording means of recording the additional information corresponding to the received identification information so as to be in synchronism with shot video and audio when the identification information is received while the contents to be broadcast are being shot.

Moreover, a thirty-first aspect of the present invention is a medium being computer-processable and carrying a program of causing a computer to function as all or some of the following means of the second apparatus according to the fifteenth aspect of the present invention: receiving means of receiving a broadcast being broadcast from a first apparatus of broadcasting additional information associated with an object appearing in contents to be broadcast, simultaneously with the contents;

voice recognizing means of recognizing a voice uttered by a viewer;

identifying or narrowing down means of identifying or narrowing down the object based on a result of the voice recognition; and display means of displaying the additional information associated with the identified or narrowed down object.

Moreover, a thirty-second aspect of the present invention is a medium being computer-processable and carrying a program of causing a computer to function as all or some of the following means of the broadcast contents creating apparatus as according to the eleventh aspect of the present invention: a transmitter attached to, of objects appearing in the contents to be broadcast, the object with which the additional information is to be associated, said transmitter transmitting identification information identifying the additional information associated with the object;

receiving means of receiving the identification information from the transmitter while the contents to be broadcast are being shot; and recording means of recording the additional information corresponding to the received identification information so as to be in synchronism with shot video and audio when the identification information is received while the contents to be broadcast are being shot.

For example, the present invention is characterized, as an example, in that a recognition word is generated or a recognition word is weighted from program additional information, when the viewer utters a voice indicating a thing, a living thing, a person or a piece of music appearing in a program and having corresponding program additional information while watching a program, the voice is recognized, the thing, the living thing, the person or the piece of music appearing in the program and specified by voice and the corresponding program additional information are stored, the thing, the living thing, the person or the piece of music appearing in the program and specified by voice and the corresponding program additional information are displayed at the point of time when the viewer finishes watching the program, and when the viewer selects at least one thing, living thing, person or piece of music and the program additional information corresponding thereto from the displayed contents, the selected contents are transmitted to the broadcasting station.

According to this structure, unlike the conventional case where the viewer memorizes or records a thing appearing in a program and searches for information thereon on the Internet or the like, a thing, a piece of music or the like appearing in a program can be obtained by a process continuous with program watching by use of a broadcast receiver and without program watching being hindered like slipping a bookmark between the pages of a book by specifying a thing appearing in the program by voice recognition and perusing the additional information of the thing specified by voice after program watching.

The present invention is characterized, as an example, in that a recognition word is generated or a recognition word is weighted from program additional information, when the viewer utters a voice indicating a thing, a living thing, a person or a piece of music appearing in a program and having corresponding program additional information while watching the program, the voice is recognized, the thing, the living thing, the person or the piece of music appearing in the program and specified by voice and the corresponding program additional information are stored, the thing, the living thing, the person or the piece of music appearing in the program and specified by voice and the corresponding program additional information are displayed at the point of time when the viewer finishes watching the program, and when the viewer selects at least one thing, living thing, person or piece of music and the program additional information corresponding thereto from the displayed contents, the selected contents are transmitted to a destination described in the program additional information.

According to this structure, unlike the conventional case where the viewer memorizes or records a thing appearing in a program and searches for information thereon on the Internet or the like, a thing, a piece of music or the like appearing in a program can be obtained by a process continuous with program watching by use of a broadcast receiver and without program watching being hindered like slipping a bookmark between the pages of a book by specifying a thing appearing in the program by voice recognition and perusing the additional information of the thing specified by voice after program watching.

The present invention is characterized, as an example, in that a voice is recognized indicating that the viewer pays attention to a thing, a living thing, a person or a piece of music appearing in a program and having corresponding program additional information while watching a program, the thing, the living thing, the person or the piece of music appearing at the point of time when the voice is uttered and before the point of time when the voice is uttered and the program additional information corresponding thereto are stored, the stored thing, living thing, person or piece of music and the program additional information corresponding thereto are displayed at the point of time when the viewer finishes watching the program, and when the viewer selects at least one thing, living thing, person or piece of music and the program additional information corresponding thereto from the displayed contents, the selected contents are transmitted to the broadcasting station.

According to this structure, unlike the conventional case where the viewer memorizes or records a thing appearing in a program and searches for information thereon on the Internet or the like, a thing, a piece of music or the like appearing in a program can be obtained by a process continuous with program watching by use of a broadcast receiver and without program watching being hindered like slipping a bookmark between the pages of a book by specifying, by voice recognition, the point of time when a thing in which the viewer is interested in the program appears and perusing the thing appearing at the point of time specified by voice after program watching and before the point of time and the additional information corresponding thereto.

The present invention is characterized, as an example, in that a voice is recognized indicating that a viewer pays attention to a thing, a living thing, a person or a piece of music appearing in a program and having corresponding program additional information while watching a program, the thing, the living thing, the person or the piece of music appearing at the point of time when the voice is uttered and before the point of time when the voice is uttered and the program additional information corresponding thereto are stored, the stored thing, living thing, person or piece of music and the program additional information corresponding thereto are displayed at the point of time when the viewer finishes watching the program, and when the viewer selects at least one thing, living thing, person or piece of music and the program additional information corresponding thereto from the displayed contents, the selected contents are transmitted to a destination described in the program additional information.

According to this structure, unlike the conventional case where the viewer memorizes or records a thing appearing in a program and searches for information thereon on the Internet or the like, a thing, a piece of music or the like appearing in a program can be obtained by a process continuous with program watching by use of a broadcast receiver and without program watching being hindered like slipping a bookmark between the pages of a book by specifying, by voice recognition, the point of time when a thing in which the viewer is interested in the program appears and perusing the thing appearing at the point of time specified by voice after program watching and before the point of time and the additional information corresponding thereto.

The present invention is characterized, as an example, in that a voice is recognized indicating that the viewer pays attention to a thing, a living thing, a person or a piece of music appearing in a program and having corresponding program additional information while watching a program, the point of time when the voice is uttered is stored, video and audio information at the point of time when the voice is uttered and from the point of time a predetermined time before the point of time when the voice is uttered to the point of time when the voice is uttered is displayed at the point of time when the viewer finishes watching the program, when the viewer selects at least one thing, living thing, person or piece of music and the program additional information corresponding thereto from the displayed contents, the additional information corresponding to the selected one is displayed, and the input made by the viewer for the selected contents is transmitted to the broadcasting station.

According to this structure, unlike the conventional case where the viewer memorizes or records a thing appearing in a program and searches for information thereon on the Internet or the like, a thing, a piece of music or the like appearing in a program can be obtained by a process continuous with program watching by use of a broadcast receiver and without program watching being hindered like slipping a bookmark between the pages of a book by specifying, by voice recognition, the point of time when a thing in which the viewer is interested in the program appears and perusing the thing appearing at the point of time specified by voice after program watching and before the point of time and the additional information corresponding thereto.

The present invention is characterized, as an example, in that a voice is recognized indicating that the viewer pays attention to a thing, a living thing, a person or a piece of music appearing in a program and having corresponding program additional information while watching a program, the point of time when the voice is uttered is stored, video and audio information at the point of time when the voice is uttered and from the point of time a predetermined time before the point of time when the voice is uttered to the point of time when the voice is uttered is displayed at the point of time when the viewer finishes watching the program, when the viewer selects at least one thing, living thing, person or piece of music and the program additional information corresponding thereto from the displayed contents, the additional information corresponding to the selected one is displayed, and the input made by the viewer for the selected contents is transmitted to a destination described in the program additional information.

According to this structure, unlike the conventional case where the viewer memorizes or records a thing appearing in a program and searches for information thereon on the Internet or the like, a thing, a piece of music or the like appearing in a program can be obtained by a process continuous with program watching by use of a broadcast receiver and without program watching being hindered like slipping a bookmark between the pages of a book by specifying, by voice recognition, the point of time when a thing in which the viewer is interested in the program appears and perusing the thing appearing at the point of time specified by voice after program watching and before the point of time and the additional information corresponding thereto.

The present invention is characterized, as an example, by a transmitter attached to an object to be provided with additional information when a program is created which transmitter transmits the additional information, a receiver of receiving the additional information, and an additional information checking portion of checking that the thing corresponding to the received additional information is recorded in the program as an image or a sound, and in that the additional information checked by the additional information checking portion is recorded in synchronism with image and sound signals.

According to this structure, unlike the conventional case where the program producer checks the scenes of the program and associates additional information with each scene, the additional information to be associated with each scene of the program can be automatically obtained from the additional information from the transmitter, and additional information can be provided to the program only by verification against an image or a sound signal.

The present invention is characterized, as an example, by a transmitter attached to an object to be provided with additional information when a program is created which transmitter transmits the code number of the additional information, a receiver of receiving the code number, and an additional information checking portion of checking that the thing corresponding to the received code number is recorded in the program as an image or a sound, and in that the additional information checked by the additional information checking portion is recorded in synchronism with image and sound signals.

According to this structure, unlike the conventional case where the program producer checks the scenes of the program and associates additional information with each scene, the additional information to be associated with each scene of the program can be automatically obtained from the code number of the additional information from the transmitter, and additional information can be provided to the program only by verification against an image or a sound signal.

EXPLANATION OF REFERENCE NUMERALS

Figure 1:
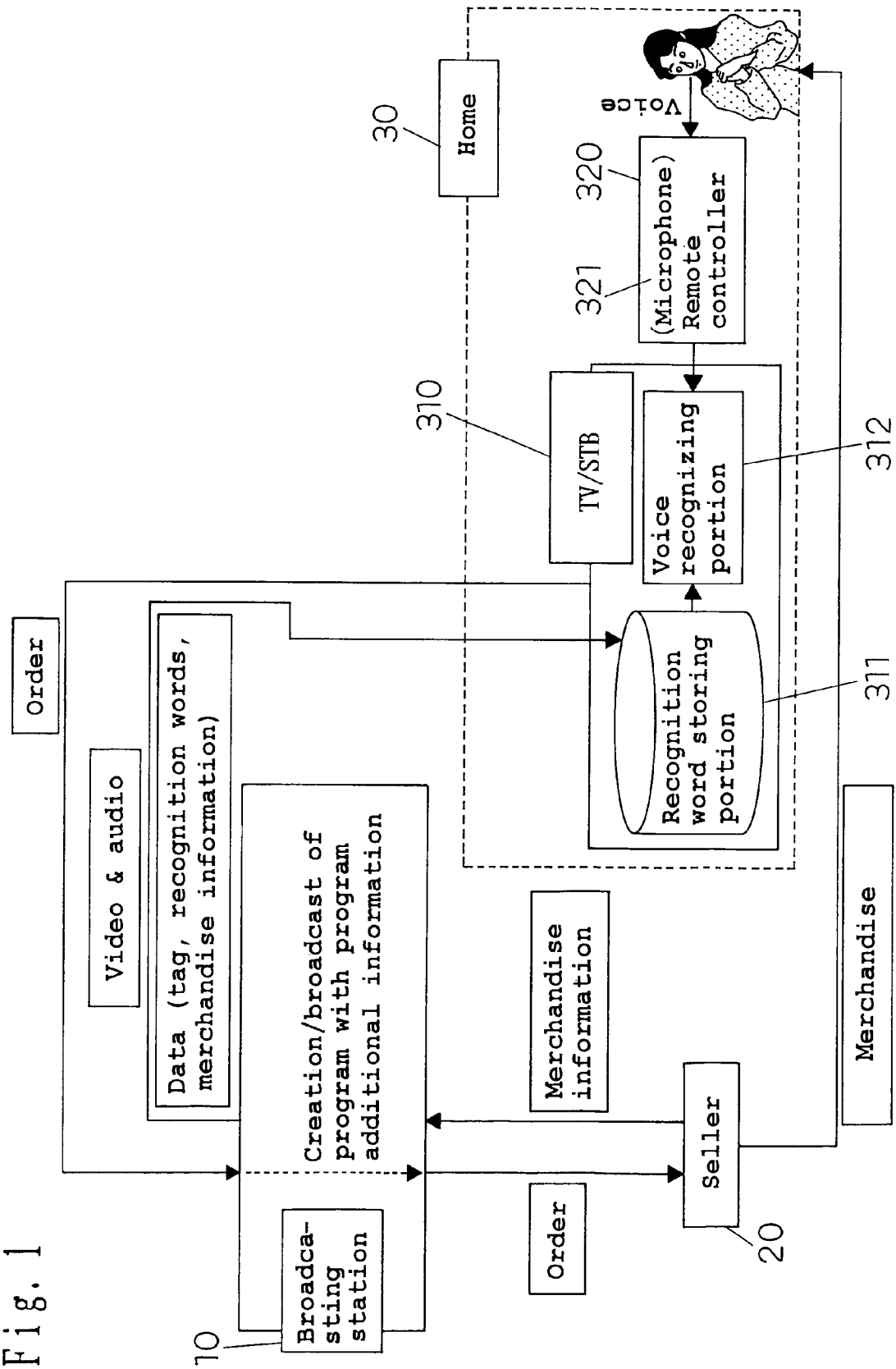
FIG. 1 is a block diagram showing the structure of a shopping support service by interactive broadcasting according to a first embodiment of the present invention.

| (Explanation of reference numerals) | |
|---|---|
| 10 | Broadcasting station |
| 20 | Seller |
| 30 | Home |
| 310 | TV/STB |
| 311 | Recognition word storing portion |
| 312 | Voice recognizing portion |
| 313 | Broadcast receiving portion |
| 314 | Recognition word generating portion |
| 315 | Storage time control portion |
| 316 | Time expression dictionary |
| 317 | Additional information storing portion |
| 318 | Display portion |
| 319 | Transmitting portion |
| 320 | Remote controller |
| 321 | Microphone |
| 1010 | Program recording apparatus |
| 1020 | Additional information code transmitter |
| 1011 | Microphone |
| 1012 | Camera |
| 1013 | Receiving portion |
| 1014 | Additional information verification database |
| 1015 | Program additional information database |
| 1016 | Program storing portion |
| 1017 | Information verifying portion |

BEST MODE FOR CARRYING OUT THE INVENTION

Hereinafter, embodiments of the present invention will be described with reference to the drawings.

First, a shopping support system by an interactive broadcasting according to a first embodiment of the present invention will be described.

Figure 2:
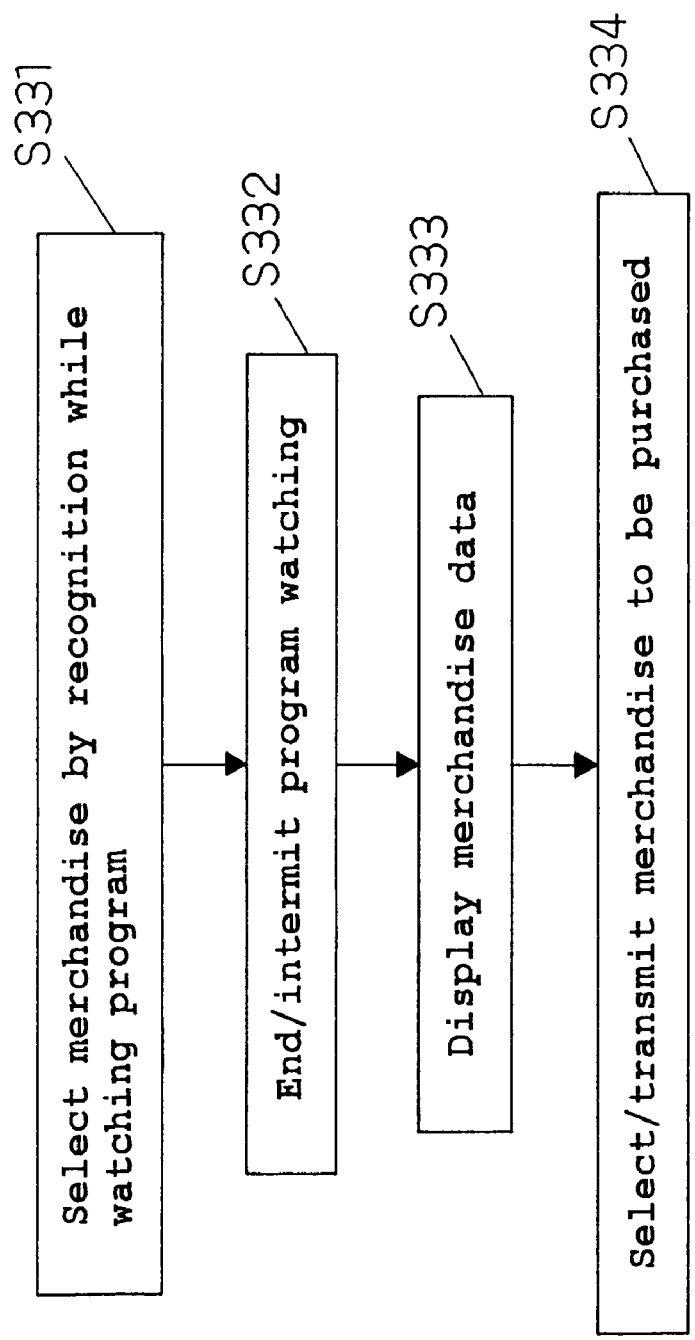
FIG. 2 is a flowchart showing the operation of a shopping support system by interactive broadcasting according to the first embodiment of the present invention.
Figure 3:
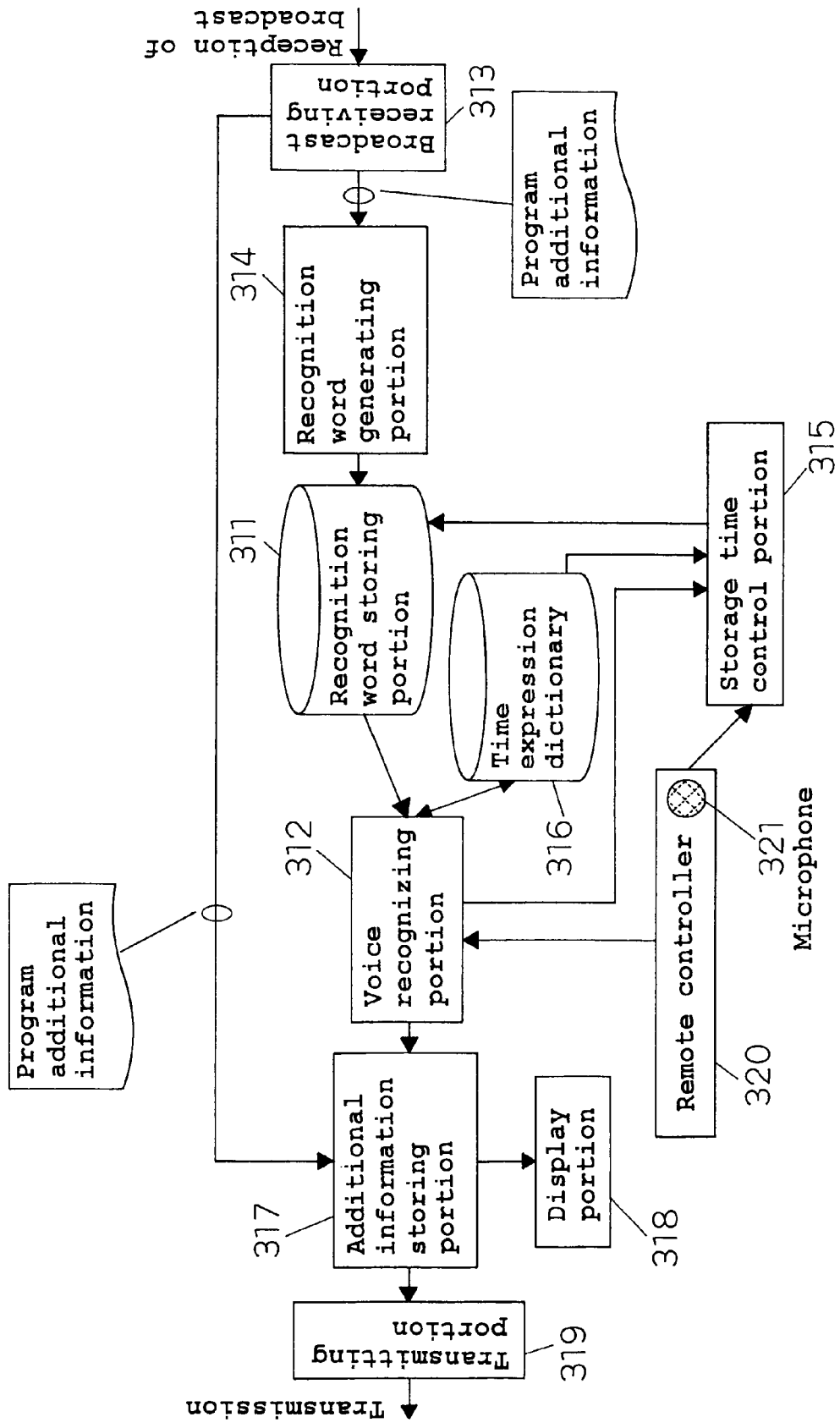
FIG. 3 is a block diagram showing the structure of a part of the shopping support service by interactive broadcasting according to the first embodiment of the present invention.

FIG. 1 shows a block diagram showing the conceptual structure of a shopping support service by interactive broadcasting according to the first embodiment of the present invention. FIG. 2 shows a flowchart showing the operation of the shopping support system by interactive broadcasting (hereinafter, abbreviated as shopping support system) according to the first embodiment of the present invention. FIG. 3 shows a functional block diagram showing details of a part of FIG. 1.

In FIG. 1, the shopping support system of the present embodiment comprises a broadcasting station 10, a seller 20 and a home 30. In the home 30, there is a TV/STB 310 and a remote controller 320.

The broadcasting station 10 broadcasts programs together with program additional information. The seller 20 is a seller handling objects appearing in the programs as merchandise. The home 30 is a home receiving broadcasts.

The TV/STB 310 is a television as an interactive broadcast receiver or an interactive broadcast receiver as an STB (set top box).

The remote controller 320 is a means of operating the TV/STB 310, and has a microphone 321.

The TV/STB 310 has a recognition word storing portion 311 and a voice recognizing portion 312. More specifically, as shown in FIG. 3, the TV/STB 310 comprises a broadcast receiving portion 313, a recognition word generating portion 314, the recognition word storing portion 311, the voice recognizing portion 312, a time expression dictionary 316, a storage time control portion 315, an additional information storing portion 317, a display portion 318, and a transmitting portion 319.

The broadcast receiving portion 313 is a means of receiving airwaves. The recognition word generating portion 314 is means of generating words to be voice-recognized, from the program additional information received by the broadcast receiving portion 313. The recognition word storing portion 311 is a means of storing the generated recognition words. The time expression dictionary 316 is a dictionary containing expressions associated with time such as "a little while ago" and "now" as recognition words. The voice recognizing portion 312 is means of performing voice recognition by use of the recognition word storing portion 311 and the time expression dictionary 316 as a recognition word dictionary. The storage time control portion 315 is means of learning the relationship between each time expression word and the actual time width or the number of scenes from the relationship between the recognized time expression word and the viewer's information selection input, and controlling the voice recognizing portion 312 and the recognition word storing portion 311. The additional information storing portion 317 is means of storing the additional information corresponding to a thing or the like in a program specified by the voice recognition. The display portion 318 is means of displaying the additional information. The transmitting portion 319 is means of transmitting the result of the viewer's input such as selection of additional information to the broadcasting station.

Next, the operation of the present embodiment will be described.

FIG. 2 shows the operation of the shopping support system and service. Description will be given with reference to FIG. 2.

First, when watching a program, the viewer pays attention to a thing or the like appearing in the program, and utters words telling that he or she is paying attention to a specific thing. Then, the microphone 321 inputs the utterance, and outputs it to the voice recognizing portion 312.

The voice recognizing portion 312 performs voice recognition on the utterance signal input from the microphone 321. Then, based on the result of the voice recognition, the voice recognizing portion 312 determines the thing or the like to which attention is paid by the viewer, identifies the corresponding program additional information, and stores it into the additional information storing portion 317 (step 331).

Concretely describing this by using as an example a case where the viewer is watching a drama, for example, when the viewer paid attention to a jacket worn by a character in the drama while watching the drama but the character wearing the jacket has retreated from the screen, the viewer says "The red jacket shown a little while ago is nice" or the like.

The microphone 321 inputs what the viewer said, and the voice recognizing portion 312 recognizes the input voice with reference to the time expression dictionary 316 and the recognition word storing portion 311 and extracts the corresponding additional information from the program additional information being broadcast.

The recognition words stored in the recognition word storing portion 311 are generated one by one from the received program additional information by the recognition word generating portion 314 as words expressing a thing, a piece of music or the like accompanied with additional information of words. That is, the program additional information also includes keyword information for identifying the thing or the piece of music with which the program additional information is associated by the broadcasting station, and the recognition word generating portion 314 generates recognition words from the keyword information. Then, the voice recognizing portion 312 voice-recognizes the viewer's utterance such as "The red jacket shown a little while ago is nice" thereby extracting recognition words from the viewer's utterance. For example, in the case of the utterance "The red jacket shown a little while ago is nice," recognition words such as "red" and "jacket" are extracted. Then, the voice recognizing portion 312 selects the program additional information including the largest number of pieces of keyword information corresponding to the extracted recognition words, and stores the selected program additional information in the additional information storing portion 317. That is, when a piece of program additional information includes both the keyword information corresponding to the recognition word "red" and the keyword information corresponding to the recognition word "jacket," the piece of program additional information is stored into the additional information storing portion 317. As described above, the voice recognizing portion 312 is capable of identifying the program additional information by selecting it.

While the voice recognizing portion 312 selects the program additional information including the largest number of pieces of keyword information corresponding to the recognition words extracted from the viewer's utterance, the present invention is not limited thereto. The voice recognizing portion 312 may select, for example, five pieces of program additional information including the largest of the fifth largest numbers of pieces of keyword information corresponding to the recognition words extracted from the viewer's utterance, and store the selected pieces of program additional information into the additional information storing portion 317. As described above, the voice recognizing portion 312 may narrow down the program additional information instead of identifying it.

The storage time control portion 315 performs control so that the generated recognition words are held for the duration of the largest time width or the largest number of scenes corresponding to a predetermined time range or number of scenes or a time expression learned from the viewer's voices uttered up to that time and the viewer's inputs made thereafter. The learning by the storage time control portion 315 will be described later. For example, in the case of the utterance "The red jacket shown a little while ago is nice," according to the control by the storage time control portion 315, the voice recognizing portion 312 extracts time expression words "a little while ago" indicating the past, and performs the above-described identification or narrowing down on the pieces of program additional information being broadcast for the duration of the time range or the number of scenes corresponding to "a little while ago" with reference to the time expression dictionary 316.

After the drama is ended (step 332), the display portion 318 displays the additional information corresponding to the thing appearing in the drama and specified by the voice recognition (step 333).

The additional information includes the size, the weight, the material, other colors, other sizes, the price, the manufacturer, the seller and the seller's contact address. The viewer checks these pieces of information, and considers whether to make a purchase or not. When making a purchase, the viewer selects the additional information and inputs purchase information with the remote controller 320 or a pointing device, or input means such as voice recognition.

The transmitting portion 319 transmits the purchase information together with the identification number of the corresponding additional information or the like to the broadcasting station (step 334).

As mentioned above, the storage time control portion 315 learns the relationship between each time expression word and the actual time width or the number of scenes from the relationship between the recognized time expression word and the viewer's information selection input. The storage time control portion 315 holds information for associating the actual time width or the number of scenes with each recognition word, which is an expression related to time, stored in the time expression dictionary 316. For example, the storage time control portion 315 associates a time width from twenty seconds to five minutes prior to the current time, for example, with the recognition words "a little while ago," and associates a time width from the current time to thirty seconds prior to the current time with "now."

Therefore, as described above, when the storage time control portion 315 receives the recognition words "a little while ago" indicating a time expression from the voice recognizing portion 312, control is performed so that the identification and the narrowing down are performed on the program additional information received for the duration of the time width from twenty seconds to five minutes prior to the current time. According to this control, the voice recognizing portion 312 performs the identification and the narrowing down on the program additional information received for the duration of the time width from twenty seconds to five minutes prior to the current time, and stores the identified or narrowed down program additional information into the additional information storing portion 317. That is, the storage time control portion 315 performs control so that the recognition words generated for the duration of the time width are held.

However, when the time width from twenty seconds to five minutes prior to the current time is associated as described above after the storage time control portion 315 receives the recognition words "a little while ago" indicating a time expression, it can occur that the program additional information displayed on the display portion 318 is different from the one received for the duration of the time width intended by the viewer. In such a case, the viewer utters, "Do it again," "Display earlier information," "Display later information," or the like to the microphone 321.

Then, the voice recognizing portion 312 voice-recognizes the utterance from the viewer, and notifies the storage time control portion 315 of the result of the voice recognition. When the voice recognizing portion 312 voice-recognizes the utterance "Display earlier information," "earlier", "information" and "display" are extracted as recognition words, and the storage time control portion 315 is notified of them.

Receiving the recognition words "earlier," "information" and "display" from the voice recognizing portion 312, the storage time control portion 315 corrects the information on the time width associated with the recognition words "a little while ago" indicating a time expression. That is, the information is corrected so that a time width from forty seconds to five minutes forty seconds prior to the current time is associated with the recognition words "a little while ago." Then, the storage time control portion 315 controls the voice recognizing portion 312 so as to perform the identification or the narrowing down of the program additional information again on the program additional information received for the duration from forty seconds to five minutes forty seconds prior to the current time. According to the control by the storage time control portion 315, the voice recognizing portion 312 performs the identification or the narrowing down of the program additional information again, and stores the identified or narrowed down program additional information into the additional information storing portion 317. The display 318 displays the program additional information stored in the additional information storing portion 317. When the target one is included in the displayed program additional information, the viewer selects the target program additional information, and inputs purchase information.

By repeating such processing a multiplicity of times, the storage time control portion 315 becomes capable of making the recognition words indicating a time expression reflect the viewer's intention, and capable of making a time width get associated with. This is that the storage time control portion 315 performs learning.

As described above, according to the shopping support system and service of the present embodiment, it is possible to obtain information on a thing, a piece of music or the like appearing in a program and in which the viewer is interested, and purchase the thing, the piece of music or the like continuously with program watching only by a natural utterance without program watching being hindered by an action such as taking notes.

While in the present embodiment, the purchase information is transmitted from the transmitting portion 319 to the broadcasting station together with the identification number of the corresponding additional information or the like, it may be transmitted to the selling agency included in the additional information.

While the voice recognizing portion 312 identifies the corresponding additional information from the result of the recognition in the present embodiment, the following may be performed: only the time stamp in the program is defined and the additional information storing portion 317 stores the time stamp and the additional information prior to the time stamp. That is, the following may also be performed: the voice recognizing portion 312 defines only the time when the viewer utters a voice and the additional information storing portion 317 stores the additional information corresponding to the time and the additional information being broadcast for a predetermined period to the time.

While the additional information storing portion 317 stores only the selected additional information in the present embodiment, it may be performed to store all the additional information of the program and display only the selected additional information by the voice recognizing portion.

While the additional information is stored, and displayed after the program is ended in the present embodiment, the additional information and the recorded program, or the corresponding scene received again by transmitting a request signal to the broadcasting station may be displayed.

While the additional information is stored, and displayed after the program is ended in the present embodiment, it may be performed to store only the identification code of the additional information and display the additional information received again by transmitting a request signal to the broadcasting station.

The broadcasting station of the present embodiment is an example of the first apparatus of the present invention, the TV/STB 310 of the present embodiment is an example of the second apparatus of the present invention, the broadcast receiving portion 314 of the present embodiment is an example of the receiving means of the present invention, the voice recognizing portion 312, the recognition word generating portion 314, the recognition word storing portion 311, the time expression dictionary 316 and the storage time control portion 315 of the present embodiment are an example of the voice recognizing means of the present invention, the voice recognizing portion 312, the recognition word generating portion 314, the recognition word storing portion 311, the time expression dictionary 316 and the storage time control portion 315 of the present embodiment are an example of the identifying or narrowing down means of the present invention, the display portion 318 of the present embodiment is an example of the display means of the present invention, the transmitting portion 319 of the present embodiment is an example of the transmitting means of the present invention, and the keyword information of the present embodiment is an example of the information for identifying or narrowing down the object of the present invention.

Second Embodiment

Figure 4:
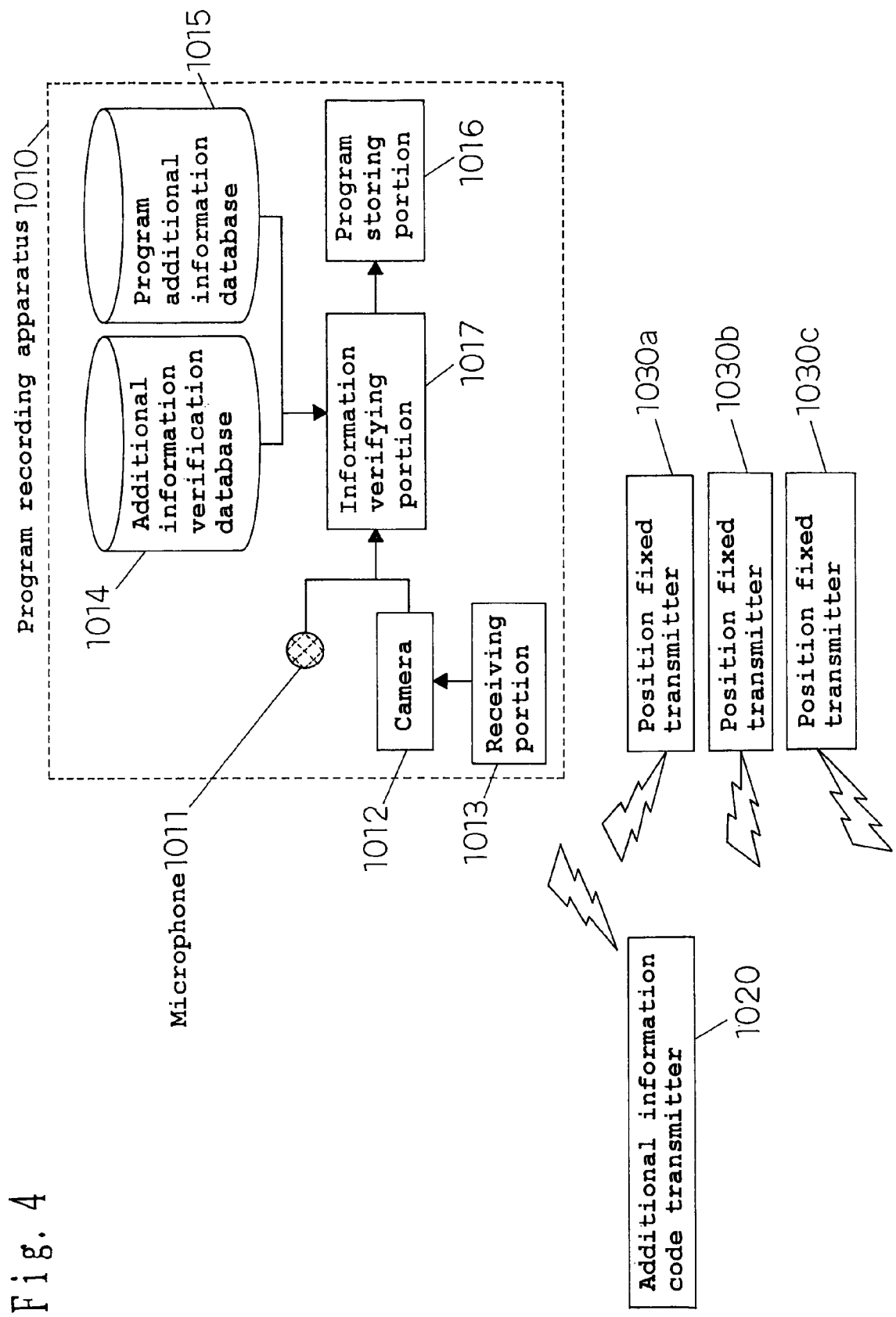
FIG. 4 is a block diagram showing the structure of a program additional information automatically creating apparatus according to a second embodiment of the present invention.
Figure 5:
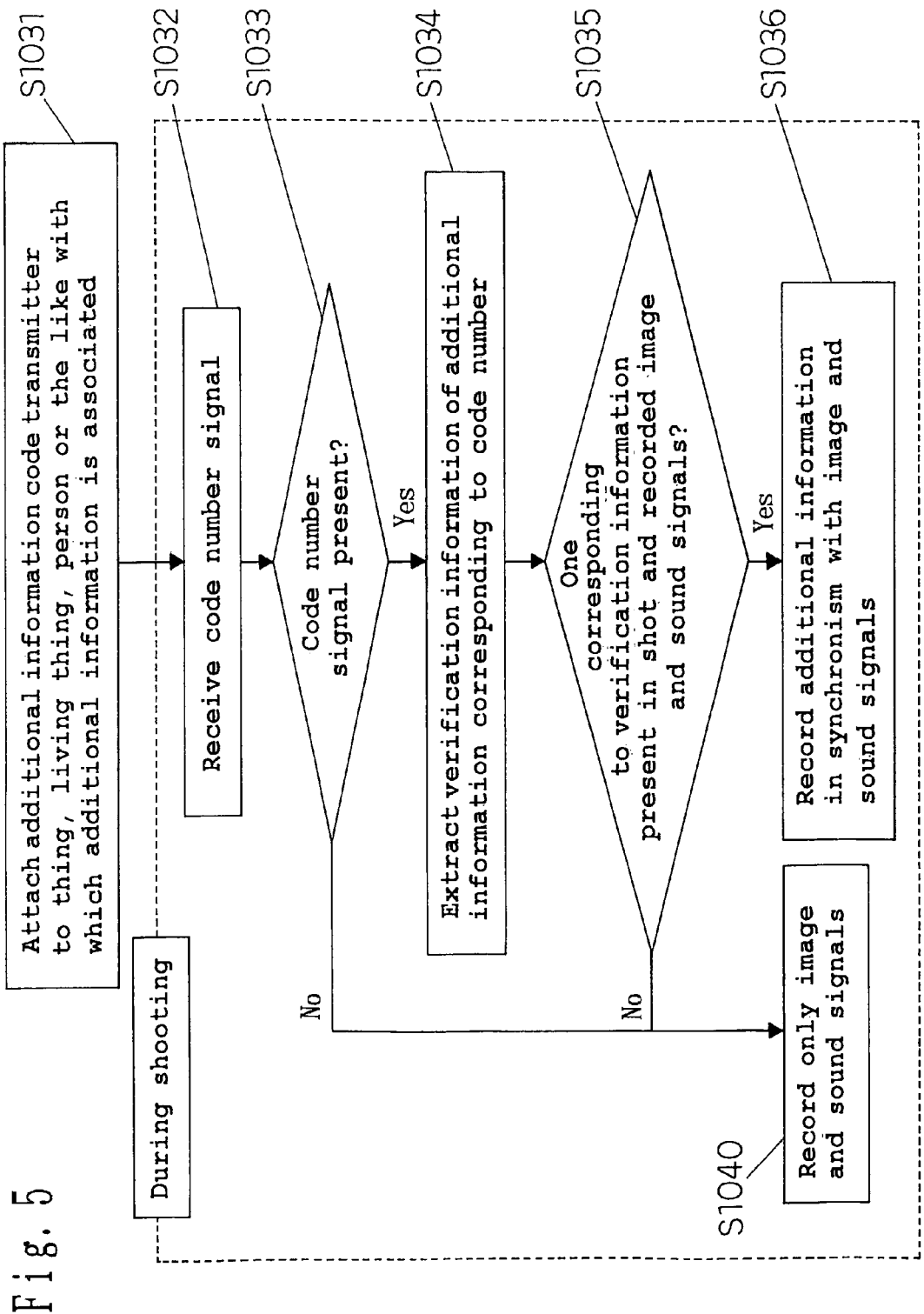
FIG. 5 is a flowchart showing the operation of the program additional information automatically creating apparatus according to the second embodiment of the present invention.

FIG. 4 is a functional block diagram showing, of a shopping support system according to a second embodiment of the present invention, a part of automatically creating program additional information for shopping simultaneously with the creation of programs. FIG. 5 shows a flowchart showing, of the shopping support system according to the second embodiment of the present invention, the operation of automatically creating program additional information simultaneously with the creation of programs.

In FIG. 4, a program recording apparatus 1010 and an additional information code transmitter 1020 are shown.

The additional information code transmitter 1020 is a transmitter of transmitting the code number of program additional information by radio waves or by infrared rays.

The program recording apparatus 1010 is provided with a microphone 1011, a camera 1012, a receiving portion 1013, an additional information verification database 1014, an information verifying portion 1017, a program additional information database 1015 and a program storing portion 1016.

The receiving portion 1013 is means of receiving a signal of the additional information code transmitter 1020. The additional information verification database 1014 is a database in which the code numbers of program additional information and the verification information of the program additional information are recorded. The information verifying portion 1017 is means of determining whether or not the thing, the living thing or the person corresponding to the additional information code received by the receiving portion 1013 is recorded on the image and sound signals input from the camera and the microphone, from the contents of the additional information verification database 1014. The program additional information database 1015 is a database in which the additional information recorded on programs is recorded. The program storing portion 1016 is means of recording the image and sound signals and the program additional information in synchronism with each other.

Next, the operation of the present embodiment will be described.

Hereinafter, description will be given with reference to FIG. 5. In a case where the operation following the flowchart of FIG. 5 is performed, only when, of a multiplicity of objects such as things, living things or persons, the object is captured in the image, the broadcast contents broadcasting the program additional information of the object can be automatically created.

First, the general outline of the operation will be described with reference to the flowchart of FIG. 5.

First, prior to shooting, the additional information code transmitter 1020 is attached to a thing, a living thing or a person additional information of which is present (step 1031).

In the shooting, image and sound signals are input through the camera 1012 and the microphone 1011 and at the same time, the signal transmitted by the additional information code transmitter is received by the receiving portion 1013 (step 1032).

Then, the information verifying portion 1017 determines whether the signal of the transmitter is present or absent and whether an additional information code is included in the received signal or not (step 1033). When the signal of the transmitter is absent or when no additional information code is included in the received signal at step 1033, only the image and sound signals input through the camera 1012 and the microphone 1011 are recorded (step 1040).

On the other hand, when an additional information code is included in the received contents at step 1033, the verification information corresponding to the additional information code is extracted from the additional information verification database 1014 (step 1034), and the information verifying portion 1017 determines whether or not one corresponding to the verification information is present in the image and sound signals input through the camera 1012 and the microphone 1011 (step 1035).

When it is determined at step 1035 that one corresponding to the verification information is absent in the input image and sound signals, only the image and sound signals input through the camera 1012 and the microphone 1011 are recorded (step 1040).

When it is determined at step 1035 that one corresponding to the verification information is present in the input image and sound signals, the corresponding program additional information is extracted from the program additional information database 1015, and recorded in synchronism with the image and sound signals (step 1036).

Figure 6:
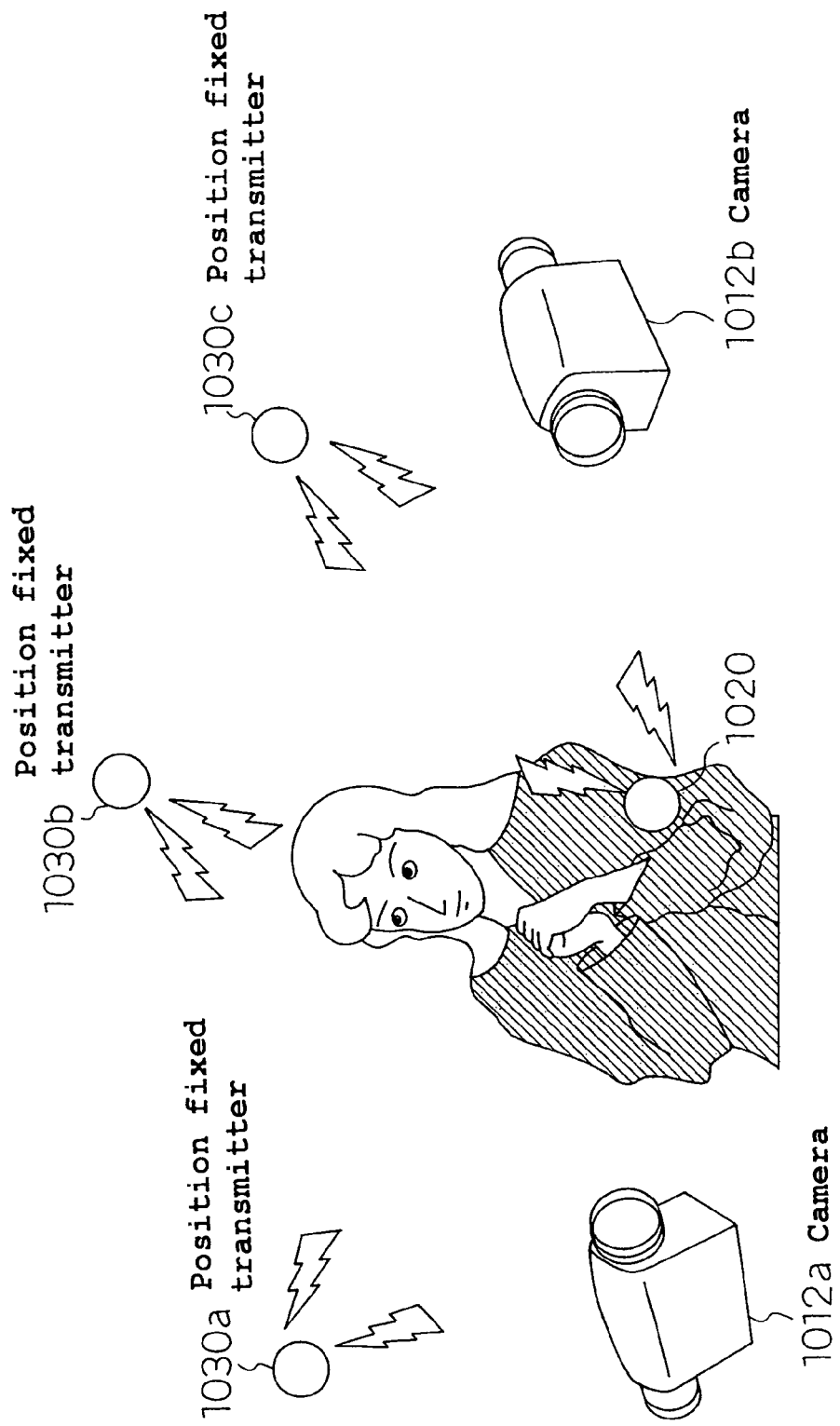
FIG. 6 is a view showing the relationship between a camera, a position fixed transmitter and an additional information code transmitter according to the second embodiment of the present invention.

FIG. 6 shows a shooting site where broadcast contents such as programs and commercials are produced. The camera 1012 is placed in the shooting site, and the position of placement of the camera 1012 can be moved. For example, the camera 1012 can be freely moved from the position of a camera 1012*a* to the position of a camera 1012*b*.

Moreover, position fixed transmitters 1030*a*, 1030*b* and 1030*c* are placed in different fixed positions in the shooting site. The position fixed transmitters 1030*a*, 1030*b* and 1030*c* form three-dimensional fixed coordinates. While three position fixed transmitters 1030*a*, 1030*b* and 1030*c* are placed in fixed positions in FIG. 6, the present invention is not limited thereto; three or more position fixed transmitters may be placed in fixed positions.

The camera 1012, which can be moved and changed in attitude, is capable of calculating information on its own position on the coordinates and attitude by receiving a signal from each of the position fixed transmitters 1030*a*, 1030*b* and 1030*c*.

On the other hand, the additional information code transmitter 1020 calculates its own position on the coordinates by receiving signals from the position fixed transmitters 1030*a*, 1030*b* and 1030*c*. Then, the additional information code transmitter 1020 transmits its own position on the coordinates.

The camera 1012 determines whether the additional information code transmitter 1020 is present within the shooting range of the camera 1012 or not from the position on the coordinates and the attitude of the camera 1012 itself, the position on the coordinates of the additional information code transmitter 1020, and the focal length and the field angle as internal information of the camera 1012.

When determining that the additional information code transmitter 1020 is present within the shooting range of the camera 1012, the camera 1012 outputs, to the information verifying portion 1017, the additional information code transmitted from the additional information code transmitter 1020. Moreover, when determining that the additional information code transmitter 1020 is absent within the shooting range of the camera 1012, the camera 1012 does not output, to the information verifying portion 1017, the additional information code transmitted from the additional information code transmitter 1020. By doing this, the information verifying portion 1017 can automatically create broadcast contents of broadcasting program additional information associated with an object only when the object is captured in the image by recording the program additional information corresponding to the additional information code 1020 so as to synchronize with the video and audio when the additional information code 1020 is transmitted.

As described above, according to the system of automatically creating program additional information simultaneously with the program creation according to the present embodiment, it is unnecessary for the producer to check all the scenes and add and record program additional information onto the program after creating the program, so that the time required for the program creation and the work cost can be reduced.

While the additional information code transmitter 1020 transits the code number of the additional information in the present embodiment, the following may be performed: the additional information code transmitter 1020 transmits additional information verification data and the information verifying portion 1016 performs verification against the image and sound signals based on the received data without using the additional information verification database.

While in the present embodiment, the information verifying portion 1017 extracts the program additional information corresponding to the code number from the program additional information database and records it so as to be in synchronism with the image and sound signals, tag information linking the program and the additional information may be recorded.

The additional information code transmitter 1020 of the present embodiment is an example of the transmitter of the present invention, the receiving portion 1013 of the present embodiment is an example of the receiving means of the present invention, and the information verifying portion 1017 and the program storing portion 1016 of the present embodiment are an example of the recording means of the present invention.

Moreover, the present invention is a program of causing a computer to execute the functions of all or some of the means (or apparatuses, devices, circuits, parts or the like) of the above-described broadcasting system, or the broadcast contents creating apparatus, the transmitter, the first apparatus or the second apparatus of the present invention, said program operating in concert with the computer.

The present invention is a medium carrying a program of causing a computer to execute all or some of the functions of all or some of the means of the above-described broadcasting system, or the broadcast contents creating apparatus, the transmitter, the first apparatus or the second apparatus of the present invention, said medium being computer-readable, said program that is read out performing the functions in concert with the computer.

Some of the means (or apparatuses, devices, circuits, parts or the like) of the present invention means some means of the plural means, or means some functions of one means.

Moreover, some of the apparatuses (or devices, circuits, parts or the like) of the present invention means some apparatuses of the plural apparatuses, some means (or devices, circuits, parts or the like) of one apparatus, or some functions of one means.

Moreover, a recording medium being computer-readable and on which the program of the present invention is recorded is also included in the present invention.

Moreover, a usage of the program of the present invention may be such that the program is recorded on a computer-readable recording medium and operates in concert with a computer.

Moreover, a usage of the program of the present invention may be such that the program is transmitted over a transmission medium, is read out by a computer and operates in concert with the computer.

Moreover, the data structure of the present invention includes databases, data formats, data tables, data lists and data kinds.

Moreover, the recording medium includes ROMs, and the transmission medium includes: transmission media such as the Internet; light; radio waves; and sound waves.

Moreover, the above-mentioned computer of the present invention is not limited to pure hardware such as a CPU, but may include firmware, an OS, and peripherals.

As described above, the structure of the present invention may be implemented either via software or via hardware.

As is apparent from the description given above, the present invention is capable of providing a broadcast receiving method, a broadcasting system, a first apparatus, a second apparatus, a medium and a program with which objects appearing in programs and commercials being broadcast can be easily obtained without any trouble.

Moreover, the present invention is capable of providing a broadcast contents creating apparatus, a transmitter, a medium and a program capable of reducing the labor and cost required for the association of the program additional information with objects appearing in programs and commercials being broadcast, and consequently, providing sufficient additional information.

The invention claimed is:

1. A broadcasting method comprising:
a broadcasting step of broadcasting additional information associated with an object appearing in contents of a broadcast sent from a broadcasting station, simultaneously with the contents;
a receiving step of receiving the broadcast;
a voice recognizing step of recognizing a voice uttered by a viewer viewing the broadcast, providing time stamp information with respect to a point of time when the viewer utters the voice;
an identifying or narrowing down step of identifying or narrowing down the object, resulting from voice recognition, from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object being searched for during the numerical time width, and
b) voice recognizing content information uttered by the viewer, the content information comprising the object; and
a display step of displaying the additional information associated with the identified or narrowed down object.

2. The broadcasting method according to claim 1,
wherein the additional information also includes information for identifying or narrowing down the object, and
wherein to identify or narrow down the object based on the result of the voice recognition is to identify or narrow down the object by use of the information for identifying or narrowing down the object.

3. The broadcasting method according to claim 2,
wherein the voice recognition also recognizes an expression indicating the past,
wherein the result of the voice recognition includes the recognized expression indicating the past, and
wherein the recognized expression indicating the past and a time width or the number of scenes of the broadcast corresponding to the expression are associated with each other.

4. The broadcasting method according to claim 3, wherein in identifying or narrowing down the object by use of the information for identifying or narrowing down the object, the information for identifying or narrowing down the object is narrowed down or weighted based on the time width or the number of scenes corresponding to the recognized expression indicating the past, and the object is identified or narrowed down by use of the narrowed down or weighted information.

5. The broadcasting method according to any of claims 1 to 4, wherein when a predetermined operation on the displayed additional information is performed, an instruction corresponding to the predetermined operation is transmitted to a predetermined destination.

6. The broadcasting method according to claim 5,
wherein the additional information is merchandise sales information and/or service sales information, and
wherein the instruction corresponding to the predetermined operation is a request for information on merchandise and/or service, or purchase information.

7. A broadcast contents creating method comprising:
a creating step of creating contents of a broadcast by broadcasting additional information associated with an object appearing in the contents of the broadcast sent from a broadcasting station, simultaneously with the contents;
a transmitting step of transmitting identification information identifying the additional information, using a transmitter attached to, of objects appearing in the contents to be broadcast, the object with which the additional information is to be associated;
wherein the broadcast is received,
wherein a voice uttered by a viewer viewing the broadcast is recognized, a time stamp information being provided with respect to point of time when the viewer utters the voice, and
wherein, resulting from voice recognition, the object is identified or narrowed down from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object being searched for during the numerical time width, and b) voice recognizing content information uttered by the viewer, the content information comprising the object;

a receiving step of receiving the identification information transmitted from the transmitter while the contents to be broadcast are recorded; and a recording step of recording the additional information in accordance with the received identification information so as to be in synchronism with the contents while the contents to be broadcast are recorded.

8. A broadcasting system comprising:

a first apparatus including broadcasting means of broadcasting additional information associated with an object appearing in contents of a broadcast sent from a broadcasting station, simultaneously with the contents; and a second apparatus including:

receiving means of receiving the broadcast;

voice recognizing means of recognizing a voice uttered by a viewer viewing the broadcast providing time stamp information with respect to a point of time when the viewer utters the voice;

identifying or narrowing down means of identifying or narrowing down the object, resulting from voice recognition, from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object being searched for during the numerical time width, and b) voice recognizing content information uttered by the viewer, the content information comprising the object; and display means of displaying the additional information associated with the identified or narrowed down object.

9. The broadcasting system according to claim 8, wherein the second apparatus includes transmitting means of transmitting, when a predetermined operation on the displayed additional information is performed, an instruction corresponding to the predetermined operation to a predetermined destination.

10. A broadcast contents creating apparatus including:

creating means of creating contents of a broadcast by broadcasting additional information associated with an object appearing in the contents of the broadcast sent from a broadcasting station, simultaneously with the contents;

a transmitter attached to, of objects appearing in the contents to be broadcast, the object with which the additional information is to be associated, the transmitter including transmitting means of transmitting identification information identifying the additional information associated with the object; and wherein the broadcast is received, wherein a voice uttered by a viewer viewing the broadcast is recognized, a time stamp information being provided with respect to a point of time when the viewer utters the voice, and wherein, resulting from voice recognition, the object is identified or narrowed down from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object is searched for during the numerical time width, and b) voice recognizing content information uttered by the viewer, the content information comprising the object;

receiving means of receiving the identification information transmitted from the transmitter while the contents to be broadcast are recorded; and recording means of recording the additional information in accordance with the received identification information so as to be in synchronism with the contents while the contents to be broadcast are recorded.

11. A transmitter included in a broadcast contents creating apparatus including creating means of creating contents of a broadcast by broadcasting additional information associated with an object appearing in the contents of the broadcast sent from a broadcasting station, simultaneously with the contents, the transmitter attached to, of objects appearing in the contents to be broadcast, the object with which the additional information is to be associated, the transmitter including transmitting means of transmitting identification information identifying the additional information associated with the object, wherein the broadcast is received, wherein a voice uttered by a viewer viewing the broadcast is recognized, a time stamp information being provided with respect to a point of time when the viewer utters the voice, and wherein, resulting from voice recognition, the object is identified or narrowed down from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object being searched for during the numerical time width, and b) voice recognizing content information uttered by the viewer, the content information comprising the object, and wherein the broadcast contents creating apparatus further includes:

receiving means of receiving the identification information transmitted from the transmitter while the contents to be broadcast are recorded; and recording means of recording the additional information in accordance with the received identification information so as to be in synchronism with the contents while the contents to be broadcast are recorded.

12. A first apparatus including broadcasting means of broadcasting additional information associated with an object appearing in contents of a broadcast sent from a broadcasting station, simultaneously with the contents, wherein the broadcast is received by a second apparatus including:

receiving means of receiving the broadcast;

voice recognizing means of recognizing a voice uttered by a viewer viewing the broadcast, providing time stamp information with respect to a point of time when the viewer utters the voice;

identifying or narrowing down means of identifying or narrowing down the object, resulting from voice recognition, from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object being searched for during the numerical time width, and b) voice recognizing content information uttered by the viewer, the content information comprising the object; and display means of displaying the additional information associated with the identified or narrowed down object.

13. The first apparatus according to claim 12, wherein the second apparatus comprises transmitting means of transmitting, when a predetermined operation on the displayed additional information is performed, an instruction corresponding to the predetermined operation to a predetermined destination.

14. A second apparatus including:

receiving means of receiving a broadcast broadcast from a first apparatus including broadcasting means of broadcasting additional information associated with an object appearing in contents of the broadcast sent from a broadcasting station, simultaneously with the contents;

voice recognizing means of recognizing a voice uttered by a viewer viewing the broadcast, providing time stamp information with respect to a point a of time when the viewer utters the voice;

identifying or narrowing down means of identifying or narrowing down the object, resulting from voice recognition, from the additional information based on:

a) voice recognizing an abstract time expression, which is not a numerical time expression, uttered by the viewer and assigning, by a controller, a corresponding numerical time width related to the abstract time expression that extends back from the time stamp information to an earlier predefined time, the object being searched for during the numerical time width, and b) voice recognizing content information uttered by the viewer, the content information comprising the object; and display means of displaying the additional information associated with the identified or narrowed down object.

15. The second apparatus according to claim 14, wherein the additional information also includes information for identifying or narrowing down the object, and wherein the voice recognizing means identifies or narrows down the object by use of the information for identifying or narrowing down the object.

16. The second apparatus according to claim 15, further comprising additional information storing means of storing the additional information broadcast for a predetermined period to the point of time when the viewer utters the voice, wherein the identifying or narrowing down means identifies or narrows down the object for objects corresponding to the stored additional information.

17. The second apparatus according to claim 15, further comprising broadcast contents recording means of recording the broadcast contents for a predetermined period, wherein the identifying or narrowing down means also identifies the point of time when the viewer utters the voice, and wherein the display means also displays, when displaying the additional information associated with the identified or narrowed down object, the contents recorded for the predetermined period to the identified point of time.

18. The second apparatus according to claim 15, wherein the voice recognizing means also recognizes an expression indicating the past, wherein the result of the voice recognition includes the recognized expression indicating the past, and wherein the recognized expression indicating the past is associated with a time width or the number of scenes of the broadcast corresponding to the expression.

19. The second apparatus according to claim 18, further comprising learning means of learning the association of the recognized expression indicating the past with the time width or the number of scenes of the broadcast corresponding to the expression, based on a user's instruction.

20. The second apparatus according to claim 18 or 19, wherein the identifying or narrowing down means narrows down or weights, when identifying or narrowing down the object by use of the information for identifying or narrowing down the object, the information for identifying or narrowing down the object based on the time width or the number of scenes corresponding to the recognized expression indicating the past, and identifies or narrows down the object by use of the narrowed down or weighted information.

21. The second apparatus according to claim 14, wherein the identifying or narrowing down means identifies the point of time when the viewer utters the voice, the display means also displays the broadcast recorded for a predetermined period to the identified point of time, and the identifying or narrowing down means identifies or narrows down the object by selecting the object from the displayed broadcast.

22. The second apparatus according to claim 21, wherein the broadcast recorded for the predetermined period to the identified point of time is one recorded by a broadcasting station, and wherein the display means performs the display by obtaining, from the broadcasting station, the broadcast recorded for the predetermined period to the identified point of time by transmitting the identified point of time to the broadcasting station.

23. The second apparatus according to claim 21, further comprising recording means of recording the broadcast recorded for the predetermined period to the identified point of time, wherein the display means performs the display by playing back the broadcast recorded for the predetermined period to the identified point of time.

24. The second apparatus according to any one of claims 14-19 or 21-23, further comprising transmitting means of transmitting, when a predetermined operation on the displayed additional information is performed, an instruction associated with the predetermined operation to a predetermined destination.

25. The second apparatus according to claim 24, wherein the predetermined destination is a broadcasting station.

26. The second apparatus according to claim 24,
wherein, in the additional information, a predetermined instruction destination is described, and
wherein the predetermined destination is the predetermined instruction destination.

27. The second apparatus according to claim 24,
wherein the additional information is merchandise sales information and/or service sales information, and
wherein the instruction corresponding to the predetermined operation is a request for information on merchandise and/or service, or purchase information.

28. The broadcasting method according to claim 1,
further comprising a transmitting step of transmitting by a receiver purchase information of the identified or narrowed down object only to a broadcasting station free of the Internet.

29. The broadcasting method according to claim 1, wherein
the display step displays the additional information after an end or an intermit of viewing the broadcast.

30. The broadcasting method according to claim 1,
wherein the identifying or narrowing down step newly identifies or narrows down the object, when the voice recognizing step recognizes an expression indicating that the additional information has been displayed for a time width different from one intended by the viewer, based on voice recognizing another time expression further uttered by the viewer and assigning, by said the control portion, a corrected time width, the object being searched for during the corrected time width, and
wherein the display step displays the additional information associated with the newly identified or narrowed down object.

31. The broadcasting system according to claim 8,
wherein the identifying or narrowing down means newly identifies or narrows down the object, when the voice recognizing means recognizes an expression indicating that the additional information has been displayed for a time width different from one intended by the viewer, based on voice recognizing another time expression further uttered by the viewer and assigning, by the control portion, a corrected time width, the object being searched for during the corrected time width, and
wherein the display means displays the additional information associated with the newly identified or narrowed down object.

32. The broadcasting method according to claim 1, wherein the corresponding numerical time width is a time width, which corresponds to the recognized abstract time expression, assigned according to information associating each of the abstract time expressions with a numerical time width.

33. the broadcasting system according to claim 8, wherein the corresponding numerical time width is a time width, which corresponds to the recognized abstract time expression, assigned according to information associating each of the abstract time expressions with a numerical time width.

* * * * *